United States Patent
Kuribara et al.

(10) Patent No.: US 10,645,280 B2
(45) Date of Patent: May 5, 2020

(54) IMAGE-SENSING SYSTEM

(71) Applicant: FANUC CORPORATION, Minamitsuru-gun, Yamanashi (JP)

(72) Inventors: Kouhei Kuribara, Yamanashi (JP); Kazuo Sato, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/364,774

(22) Filed: Mar. 26, 2019

(65) Prior Publication Data

US 2019/0306418 A1    Oct. 3, 2019

(30) Foreign Application Priority Data

Mar. 29, 2018    (JP) .................................. 2018-065533

(51) Int. Cl.
   *H04N 5/232* (2006.01)
   *G06T 7/55* (2017.01)

(52) U.S. Cl.
   CPC .......... *H04N 5/23232* (2013.01); *G06T 7/55* (2017.01); *G06T 2207/30164* (2013.01)

(58) Field of Classification Search
   None
   See application file for complete search history.

(56) References Cited

U.S. PATENT DOCUMENTS

2015/0276400 A1*  10/2015  Gonzalez-Banos ....... G06T 7/77
                                                                    348/169
2019/0323971 A1*  10/2019  Yoshida ............... G01N 21/952

FOREIGN PATENT DOCUMENTS

| DE | 10 2016 114 190 | 2/2018 |
| JP | 7-1294 | 1/1995 |
| JP | 8-294849 | 11/1996 |
| WO | 2017/061318 | 4/2017 |

OTHER PUBLICATIONS

Notification of Reasons for Refusal dated Dec. 17, 2019 in corresponding Japanese Application No. 2018-065533.

* cited by examiner

*Primary Examiner* — Talha M Nawaz
(74) *Attorney, Agent, or Firm* — Wenderoth, Lind & Ponack, L.LP.

(57) ABSTRACT

An object is to provide an image-sensing system which can acquire uniform images with a line sensor camera. An image-sensing system includes: a line sensor camera that shoots a workpiece in which a plurality of circumferential surfaces whose radii differ from each other are aligned in a direction of an axis and which is being machined while being rotated about the axis from a direction orthogonal to the axis so as to cover the entire workpiece in the direction of the axis; and a scan rate change unit which changes a scan rate of the line sensor camera to values that respectively correspond to the radii of the circumferential surfaces, and the line sensor camera shoots the workpiece at the scan rates which are changed to the values corresponding to the radii of the circumferential surfaces so as to respectively correspond to the circumferential surfaces.

2 Claims, 4 Drawing Sheets

IMAGE-SENSING SYSTEM

This application is based on and claims the benefit of priority from Japanese Patent Application No. 2018-065533, filed on 29 Mar. 2018, the content of which is incorporated herein by reference.

BACKGROUND OF THE INVENTION

Field of the Invention

The present invention relates to an image-sensing system which senses an image of a workpiece.

Related Art

Conventionally, a line sensor camera (also referred to as a line scan camera) is known which shoots a workplace after being machined in a state where the workpiece is attached to a machine tool (see, for example, patent document 1). The line sensor camera is characterized in that as compared with an area sensor camera, the line sensor camera can easily shoot continuous images and can shoot high-resolution images with low distortion. Images shot with the line sensor camera as described above are utilized in inspections for defects such as a foreign material, a scratch, a hole and a stain.

Patent Document 1: Japanese Unexamined Patent Application, Publication No. H07-001294

SUMMARY OF THE INVENTION

Since the resolution of the line sensor camera is affected by a scan rate and the speed of a subject, in order to acquire uniform images, a certain level of preparation such as synchronization with an encoder is needed. When a workpiece having circumferential surfaces whose radii differ in a stepwise manner is shot, the distance from the line sensor camera differs in a stepwise manner, and thus the resolution of images shot differs in a stepwise manner, with the result that uniform images cannot be acquired.

The present invention is made in view of the foregoing problem, and an object thereof is to provide an image-sensing system which can acquire uniform images with a line sensor camera.

(1) An image-sensing system (for example, an image-sensing system 1 which will be described later) according to the present invention includes: a line sensor camera (for example, a line sensor camera 4 which will be described later) that shoots a workpiece (for example, a workpiece W which will be described later) in which a plurality of circumferential surfaces (for example, circumferential surfaces W1, W2 which will be described later) whose radii differ from each other are aligned in the direction of an axis (for example, the direction D1 of an axis which will be described later) and which is being machined while being rotated about the axis from a direction orthogonal to the axis (for example, an orthogonal direction D2 which will be described later) so as to cover the entire workpiece in the direction of the axis; and a scan rate change unit (for example, a scan rate change unit 20 which will be described later) which changes a scan rate (for example, a scan rate S which will be described later) of the line sensor camera to values that respectively correspond to the radii of the circumferential surfaces, and the line sensor camera shoots the workpiece at the scan rates which are changed to the values corresponding to the radii of the circumferential surfaces so as to respectively correspond to the circumferential surfaces.

(2) Preferably, the image-sensing system of (1) includes: an image processing unit (for example, an image processing unit 21 which will be described later) which extracts, from a plurality of images that are shot so as to respectively correspond to the circumferential surfaces, parts of the circumferential surfaces whose radii correspond to the values of the scan rates of the line sensor camera at which the images are shot, and which combines the extracted parts of the circumferential surfaces.

According to the present invention, it is possible to provide an image-sensing system which can acquire uniform images with a line sensor camera.

DETAILED DESCRIPTION OF THE INVENTION

An embodiment of the present invention will be described in detail below with reference to drawings.

Figure 1:
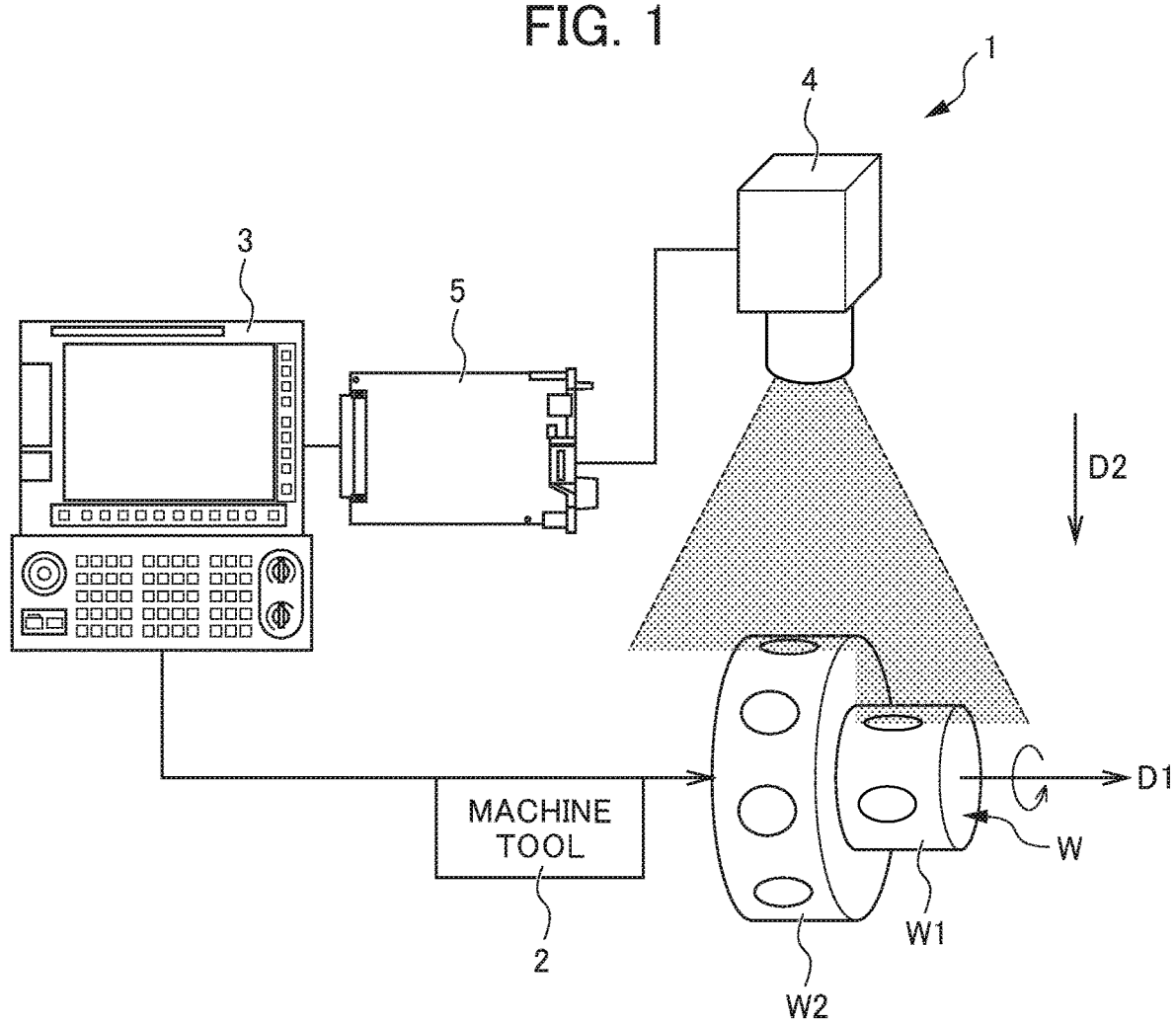
FIG. 1 is a diagram showing a schematic configuration of an image-sensing system according to an embodiment of the present invention.
Figure 2:
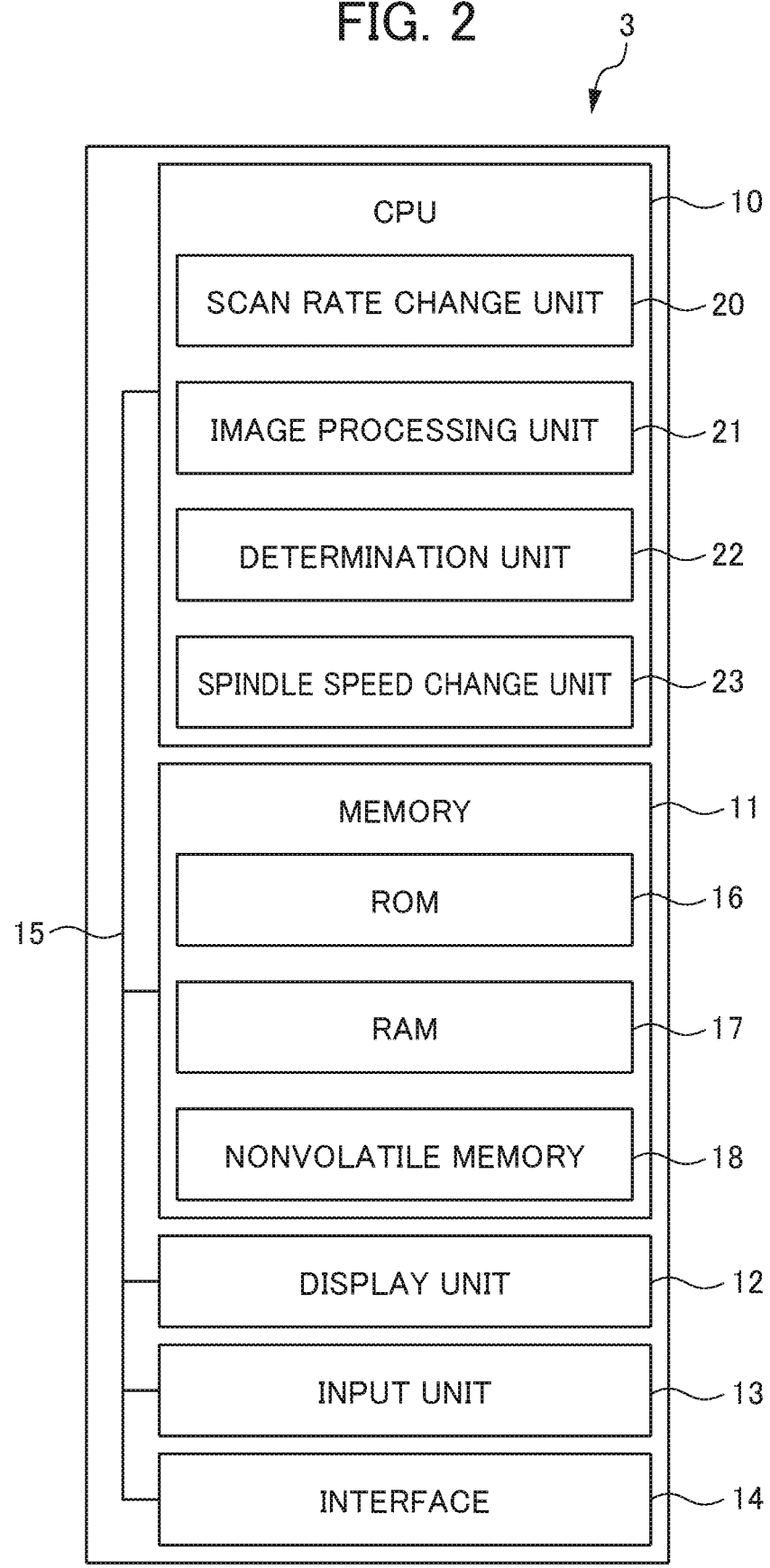
FIG. 2 is a function block diagram showing the configuration of a numerical controller in the embodiment of the present invention.
Figure 3:
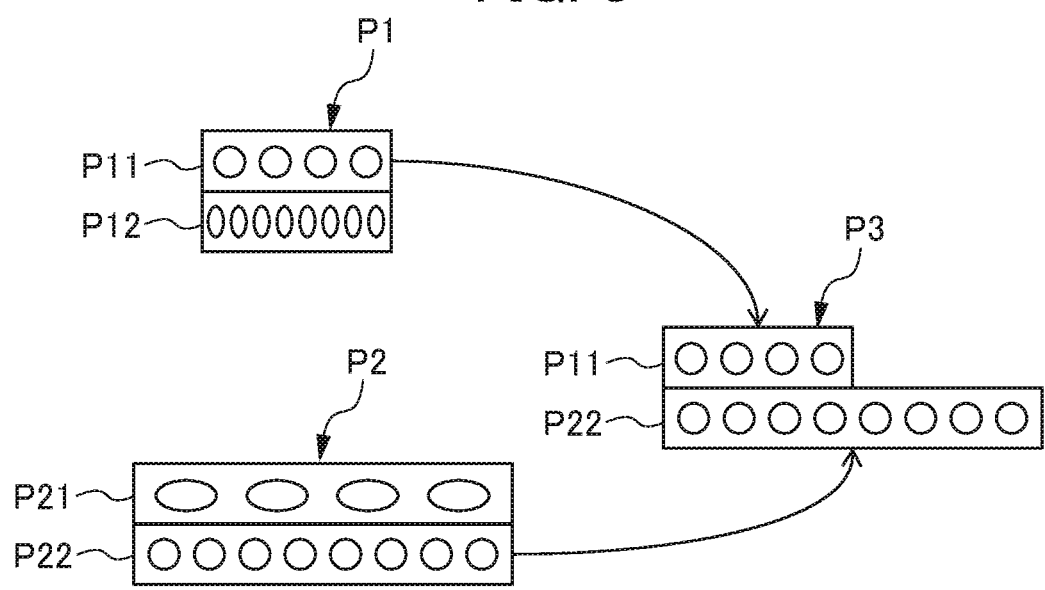
FIG. 3 is a diagram for illustrating the function of an image processing unit in the embodiment of the present invention.

The configuration of an image-sensing system 1 according to the present embodiment will first be described with reference to FIGS. 1, 2 and 3. FIG. 1 is a diagram showing a schematic configuration of the image-sensing system 1 according to the present embodiment. FIG. 2 is a function block diagram showing the configuration of a numerical controller 3 in the present embodiment. FIG. 3 is a diagram for illustrating the function of an image processing unit 21 in the present embodiment.

Here, a plurality of uniform true circular patterns which are arranged at regular intervals on circumferential surfaces W1 and W2 in a workpiece W of FIG. 1 whose radii differ from each other are provided for convenience of description. Likewise, a plurality of uniform true circular patterns which are arranged at regular intervals in the images P1, P2 and P3 of FIG. 3 are also provided for convenience of description.

The image-sensing system 1 shown in FIG. 1 is a system which shoots the workpiece W that is being machined in a machine tool 2. In the workpiece W which is a target to be shot by the image-sensing system 1, the circumferential surfaces W1 and W2 whose radii differ from each other are aligned in the direction D1 of an axis of a spindle (which is not shown in the figure) in the machine tool 2, and the workpiece W is rotated about the spindle. In other words, with the machine tool 2 which will be described later, a cylindrical portion whose radius is large and a cylindrical portion whose radius is small are machined so as to be aligned in the direction D1 of the axis, and the image-sensing system 1 shoots the shape of the machined workpiece W as described above.

As shown in FIG. 1, the image-sensing system 1 according to the present embodiment includes the machine tool 2, the numerical controller (CNC device) 3, a line sensor camera 4 and a camera control unit 5. Here, the line sensor camera is also referred to as a line scan camera.

Under control of the numerical controller 3, the machine tool 2 rotates the workpiece W which is attached to the spindle (which is not shown in the figure), and presses a cutting tool (which is not shown in the figure) attached to a tool post (which is not shown in the figure) onto the workpiece W so as to perform cutting (turning).

As shown in FIG. 2, the numerical controller 3 includes a CPU 10, a memory 11, a display unit 12, an input unit 13, an interface 14 and a bus 15.

The CPU 10 is a processor which comprehensively controls the image-sensing system 1 (see FIG. 1). The CPU 10 is connected through the bus 15 to the memory 11, the display unit 12, the input unit 13 and the interface 14. The memory 11 is formed with a ROM 16, a RAM 17, a nonvolatile memory 18 and the like. The display unit 12 displays information necessary for an operator. The input unit 13 is a keyboard or the like for inputting various types of commands and data. The interface 14 is connected to an external storage medium, a host computer and the like so as to exchange various types of commands and data.

The CPU 10 functions as a scan rate change unit 20, an image processing unit 21, a determination unit 22, a spindle speed change unit 23 and the like.

The scan rate change unit 20 changes the scan rate [μ sec.] of the line sensor camera 4 (see FIG. 1) to values which respectively correspond to the radii of the circumferential surfaces W1 and W2 of the workplace W (see FIG. 1.). Specifically, the scan rate change unit 20 acquires, from programs stored in the memory 11, the radii (radii r [mm]) of the circumferential surfaces W1 and W2 (see FIG. 1) and the speed n [rpm] of the spindle in the machine tool 2 (see FIG. 1). Then, the scan rate change unit 20 calculates the surface speeds V [mm/sec.]=2πr×n/60 of the circumferential surfaces W1 and W2, and uses the preset resolution R [mm/pix] of the line sensor camera 4 (see FIG. 1) so as to calculate the scan rates S [μ sec.]=R×$10^6$/V.

More specifically, the scan rate change unit 20 calculates, according to surface speeds V of the circumferential surfaces W1 and W2 which are calculated, the scan rates S at which desired high resolutions can be obtained. In this way, a scan rate S1 at which a desired high resolution corresponding to the circumferential surface W1 can be obtained and a scan rate S2 at which a desired high resolution corresponding to the circumferential surface W2 can be obtained are calculated.

Then, the scan rate change unit 20 changes, based on the result of the calculation, the scan rates S [μ sec.] of the line sensor camera 4 (see FIG. 1) according to each of the circumferential surfaces W1 and W2. The scan rate change unit 20 may acquire the radii (radii r [mm]) of the circumferential surfaces W1 and W2 (see FIG. 1) from the result of analysis of data of images shot with the line sensor camera 4 (see FIG. 1) instead of the machining programs stored in the memory 11. Specifically, based on a known relationship between the camera coordinates of the line sensor camera 4 and the machine coordinates of the machine tool 2, distances between the line sensor camera 4 and the circumferential surfaces W1 and W2 of the workpiece W and the spindle may be calculated from image data shot, and based on the calculated distances, the radii of the circumferential surfaces W1 and W2 may be calculated and acquired.

The image processing unit 21 extracts, from the images P1 and P2 (see FIG. 3) which are shot by the line sensor camera 1 (see FIG. 1) so as to respectively correspond to the circumferential surfaces W1 and W2, parts of the circumferential surfaces whose radii correspond to the values of the scan rates S of the line sensor camera 4 (see FIG. 1) at which the images P1 and P2 (see FIG. 3) are shot, and combines the extracted parts of the circumferential surfaces W1 and W2 so as to produce the new image P3 (see FIG. 3).

In other words, as shown in FIG. 3, the image processing unit 21 (see FIG. 2) extracts the part P11 of the circumferential surface W1 from the image P1 shot at the scan rate S [μ sec.] corresponding to the circumferential surface W1 (see FIG. 1), and extracts the part P22 of the circumferential surface W2 from the image P2 shot at the scan rate S [μ sec.] corresponding to the circumferential surface W2. Then, the image processing unit 21 (see FIG. 2) combines the extracted part P11 of the circumferential surface W1 and the extracted part P22 of the circumferential surface W2, and thereby produces the new image P3. In this way, the image P3 is a combination of the image P11 and the image P22 in which the desired high resolutions respectively corresponding to the radii of the circumferential surfaces W1 and P2 can be obtained, with the result that the image P3 is a uniform image.

With reference back to FIG. 2, the determination unit 22 compares the scan rates S [μ sec.] calculated by the scan rate change unit 20 and the minimum value $S_{min}$ [μ sec.] of the scan rate which can be set by the line sensor camera 4 (see FIG. 1). Then, the determination unit 22 determines whether or not the scan rates S [μ sec.] calculated by the scan rate change unit 20 are equal to or more than the minimum value $S_{min}$ [μ sec.] of the scan rate which can be set by the line sensor camera 4 (see FIG. 1).

When the determination unit 22 determines that the scan rates S [μ sec.] calculated by the scan rate change unit 20 are not equal to or more than the minimum value $S_{min}$ [μ sec.] of the scan rate which can be set by the line sensor camera 4 (see FIG. 1), the determination unit 22 further determines whether or not the parts corresponding to the scan rates are being machined. Even when the determination unit 22 determines that the parts corresponding to the scan rates are "not being machined", the parts which do not correspond to the scan rates are being machined, and thus the workpiece W as a whole is being machined.

When the determination unit 22 determines that the workpiece W is not being machined, the spindle speed change unit 23 sets the speed n [rpm] of the spindle in the machine tool 2 (see FIG. 1) such that the calculated scan rates S [μ sec.] of the line sensor camera 4 (see FIG. 1) are the minimum value $S_{min}$ [μ sec.] which can be set.

With reference back to FIG. 1, the line sensor camera 4 shoots the workpiece W from a direction D2 orthogonal to the spindle (which is not shown in the figure) of the machine tool 2 so as to cover the entire workpiece W in the direction D1 of the axis. Specifically, the line sensor camera 4 shoots the workpiece W at the scan rates S [μ sec.] which are changed to the values corresponding to the radii of the circumferential surfaces W1 and W2 so as to respectively correspond to the circumferential surfaces W1 and W2. The data of the images shot with the line sensor camera 4 is fed through the camera control unit 5 to the numerical controller 3.

Figure 4:
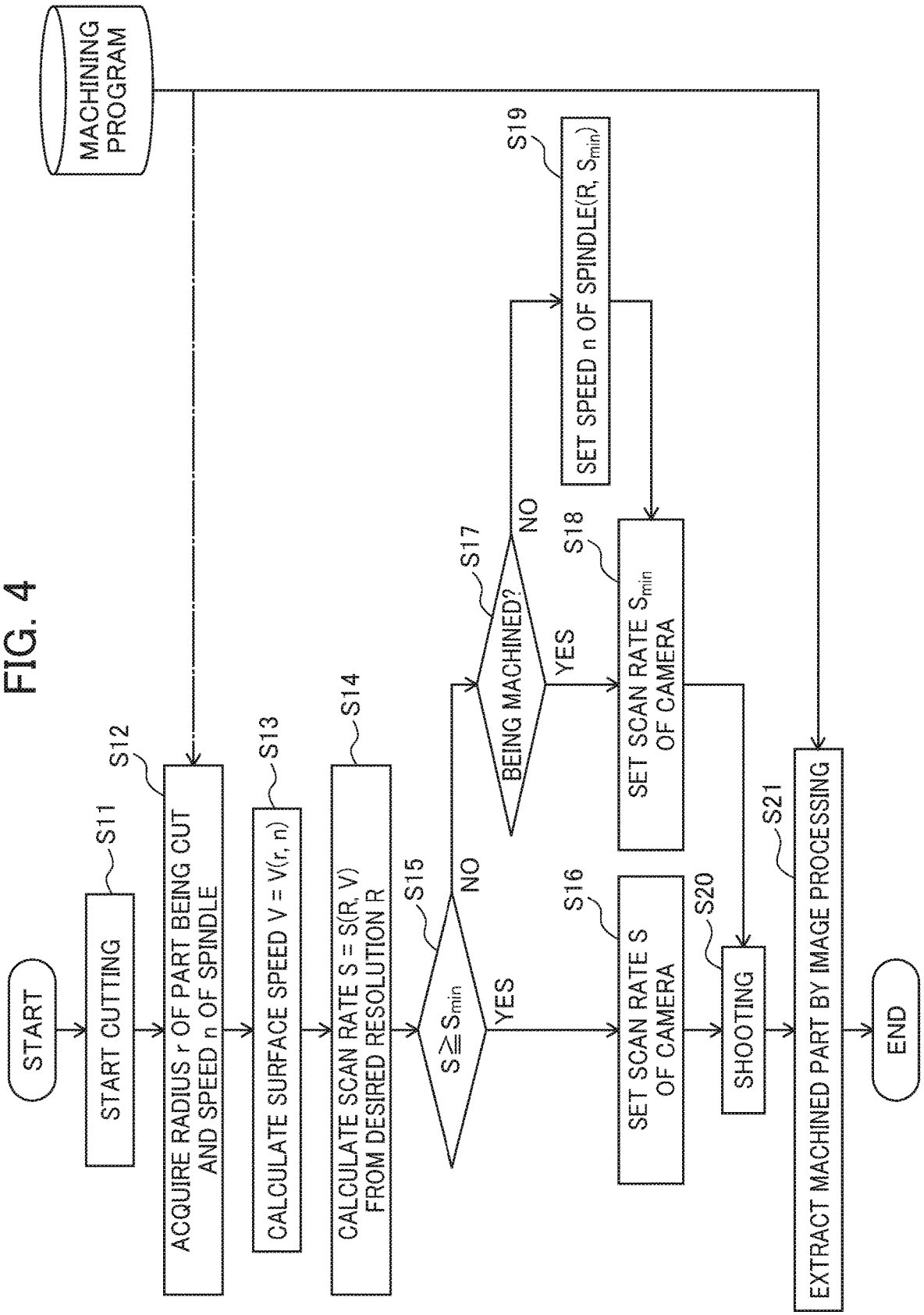
FIG. 4 is a flowchart showing the flow of the operation of the image-sensing system according to the embodiment of the present invention.

The operation of the image-sensing system 1 will then be described with reference to FIG. 4. FIG. 4 is a flowchart showing the flow of the operation of the image-sensing system 1.

As shown in FIG. 4, in step S11, the cutting of the workpiece W with the machine tool 2 is first started. Then, the process proceeds to step S12, and the scan rate change unit 20 acquires the radii (radii r [mm]) of parts of the workpiece W which are being cut and the speed n [rpm] of the spindle in the machine tool 2. As described previously, the radii of the workpiece W may be acquired from the machining programs of the numerical controller 3 or may be acquired by calculation from images shot with the line sensor camera 4.

Then, the process proceeds to step S13, and the scan rate change unit 20 calculates the surface speeds V [mm/sec.] of the parts of the workpiece W which are being cut. After the calculation, the process proceeds to step S14, and the scan rates S [μ sec.] which respectively correspond to the circumferential surfaces W1 and W2 of the workpiece W are calculated from the desired resolutions R [mm/pix] of the line sensor camera 4.

Then, the process proceeds to step S15, and the determination unit 22 determines whether or not the scan rates S [μ sec.] calculated by the scan rate change unit 20 are equal to or more than the minimum value $S_{min}$ [μ sec.] of the scan rate which can be set by the line sensor camera 4. The minimum value $S_{min}$ of the scan rate is previously set according to the performance of the line sensor camera 4.

When the determination of step S15 is yes, that is, when the scan rates S [μ sec.] calculated by the scan rate change unit 20 are equal to or more than the minimum value $S_{min}$ [μ sec.] of the scan rate which can be set by the line sensor camera 4, the process proceeds to step S16, and the scan rate change unit 20 changes the scan rate S [μ sec.] of the line sensor camera 4 to the calculated values. After the change, the process proceeds to step S20.

When the determination of step S15 is no, that is, when the scan rates S [μ sec.] calculated by the scan rate change unit 20 are not equal to or more than the minimum value $S_{min}$ [μ sec.] of the scan rate which can be set by the line sensor camera 4, the process proceeds to step S17, and the determination unit 22 determines whether or not the parts corresponding to the scan rates are being machined.

When the determination of step S17 is yes, that is, when the parts corresponding to the scan rates S are being machined, the process proceeds to step S18, and the scan rate change unit 20 changes the scan rate S [μ sec.] of the line sensor camera 4 to the minimum value $S_{min}$ [μ sec.] which can be set. After the change, the process proceeds to step S20.

When the determination of step S17 is no, that is, when the parts corresponding to the scan rates S are not being machined, the process proceeds to step S19, and the spindle speed change unit 23 sets the speed n [rpm] of the spindle in the machine tool 2 such that the calculated scan rates S [μ sec.] of the line sensor camera 4 are the minimum value $S_{min}$ [μ sec.] which can be set. After the setting, the process proceeds to step S18, and the scan rate change unit 20 changes the scan rate S [μ sec.] of the line sensor camera 4 to the minimum value $S_{min}$ [μ sec.] which can be set. After the change, the process proceeds to step S20.

In step S20, the workpiece W is shot with the line sensor camera 4 at the scan rates S [μ sec.] of the line sensor camera 4 which are changed in the individual steps described above. After the shooting, the process proceeds to step S21, and the image processing unit 21 extracts the machined parts from the images shot. Specifically, as described previously, the part P11 of the circumferential surface W1 is extracted from the image P1 shot at the scan rate S corresponding to the circumferential surface W1, and the part P22 of the circumferential surface W2 is extracted from the image P2 shot at the scan rate corresponding to the circumferential surface W2. After the extraction, the present process is completed.

The present process is repeatedly performed. The image processing unit 21 combines the extracted parts so as to produce the new image. As necessary, the produced image is displayed on the display unit 12 or the like and is output.

As described above, in the image-sensing system 1 according to the present embodiment, even when the workpiece W is being machined, with the line sensor camera, it is possible to acquire a uniform high-resolution image. Hence, even when the workpiece W is being machined, the inspection of the workpiece W can be performed. Even when the workpiece W has the circumferential surfaces W1 and W2 whose radii differ from each other, it is possible to acquire the images of the surfaces at constant desired resolutions, with the result that it is possible to compare a plurality of parts whose radii differ from each other.

Although the embodiment of the present invention is described above, the present invention is not limited to the embodiment described above. The effects described in the present embodiment are simply a list of the most preferred effects produced from the present invention, and the effects of the present invention are not limited to the effects described in the present embodiment.

For example, although in the embodiment described above, the machined workpiece W is shaped such that the two circumferential surfaces W1 and W2 whose radii differ from each other are aligned in the direction D1 of the axis of the spindle, there is no limitation to this shape. The machined workpiece W may be shaped such that three or more circumferential surfaces whose radii differ from each other are aligned in the direction D1 of the axis as long as they fall within the range of shooting of the line sensor camera 4.

Although in the embodiment described above, the CPU 10 of the image-sensing system 1 which functions as the scan rate change unit 20, the image processing unit 21, the determination unit 22 and the spindle speed change unit 23 is incorporated in the numerical controller 3, there is no limitation to this configuration. The CPU 10 may be incorporated in a higher controller other than the numerical controller 3, a separate PC or the like.

EXPLANATION OF REFERENCE NUMERALS 1 image-sensing system
2 machine tool
3 numerical controller
4 line sensor camera
5 camera control unit
10 CPU
11 memory
12 display unit
13 input unit
14 interface
15 bus
16 ROM
17 RAM
18 nonvolatile memory
20 scan rate change unit
21 image processing unit
22 determination unit
23 spindle speed change unit
W workpiece
W1, W2 circumferential surface
D1 direction of axis D2 orthogonal direction
S scan rate
R radius
n speed
V surface speed
R resolution
P1, P2 image

What is claimed is:

1. An image-sensing system comprising: a line sensor camera that shoots a workpiece in which a plurality of circumferential surfaces whose radii differ from each other are aligned in a direction of an axis and which is being machined while being rotated about the axis from a direction orthogonal to the axis so as to cover the entire workpiece in the direction of the axis; and a scan rate change unit which changes a scan rate of the line sensor camera to values that respectively correspond to the radii of the circumferential surfaces, wherein the line sensor camera shoots the workpiece at the scan rates which are changed to the values corresponding to the radii of the circumferential surfaces so as to respectively correspond to the circumferential surfaces.

2. The image-sensing system according to claim 1, comprising: an image processing unit which extracts, from a plurality of images that are shot so as to respectively correspond to the circumferential surfaces, parts of the circumferential surfaces whose radii correspond to the values of the scan rates of the line sensor camera at which the images are shot, and which combines the extracted parts of the circumferential surfaces.

* * * * *